UNITED STATES PATENT OFFICE.

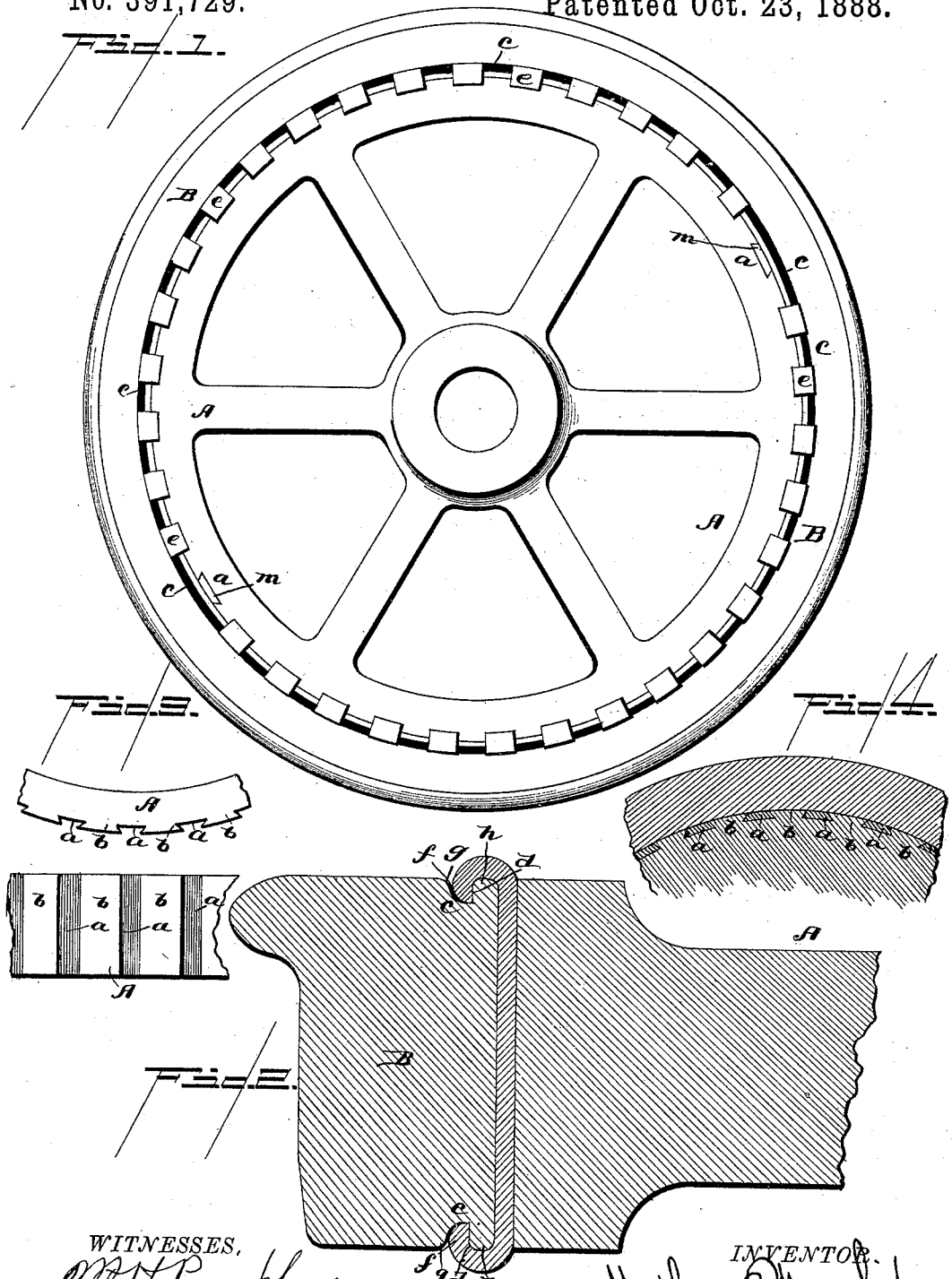

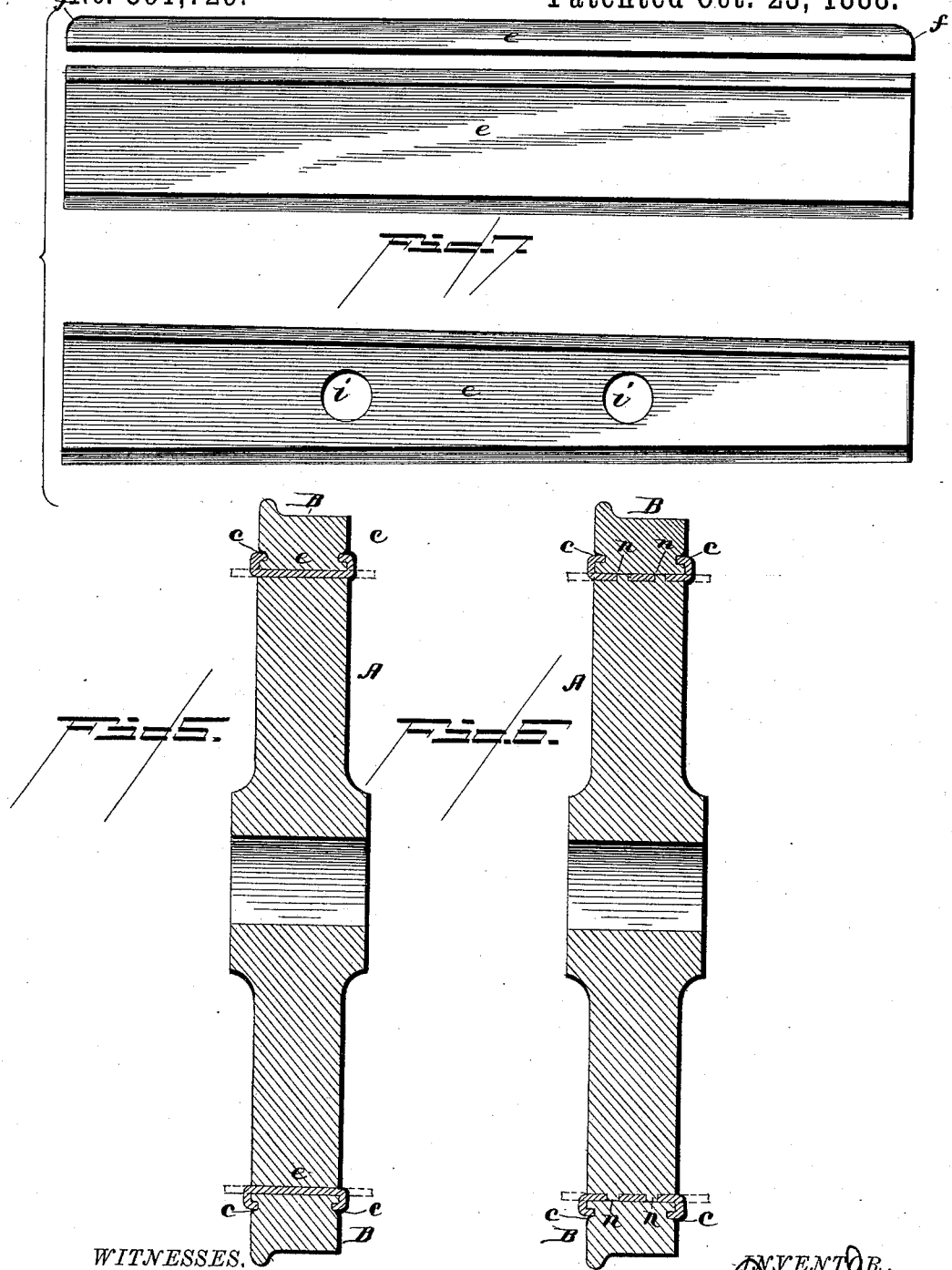

NATHAN WRIGHT, OF CLEVELAND, OHIO.

CAR-WHEEL.

SPECIFICATION forming part of Letters Patent No. 391,729, dated October 23, 1888.

Application filed July 18, 1888. Serial No. 280,268. (No model.)

*To all whom it may concern:*

Be it known that I, NATHAN WRIGHT, a citizen of the United States, residing at Cleveland, in the county of Cuyahoga and State of Ohio, have invented new and useful Improvements in Car-Wheels, of which the following is a specification.

My invention relates to that class of car-wheels in which a steel tire is secured upon a cast-iron center, and the particular matter of my improvement is directed to the means by which the tire is secured directly upon the center of the wheel and removed and renewed when found necessary.

An important advantage of my improvement is the provision by which the fastening device for the tire is fixed first directly to the center part and then fixed to the tire in a manner to secure the latter in perfect relation to the center part in an effective and simple manner.

A more specific statement of the points of novelty will be found in the claims concluding this specification.

The following is a description of the drawings, in which is illustrated my improved car-wheel:

Figure 1 represents a side view of the complete wheel. Fig. 2 is an enlarged sectional view more fully illustrating the fastening of the tire directly upon the wheel-center. Fig. 3 are detail views showing the grooved circumference of the wheel-center. Fig. 4 is a detail view of the fastened parts, taken at right angles to Fig. 2. Fig. 5 is an axial section of the complete wheel. Fig. 6 is a similar view showing a modification in the fastening-keys, and Fig. 7 are views of the fastening-keys.

In the drawings, A is the wheel-center, which is usually of cast-iron. Its periphery is formed with dovetailed grooves $a$, which extend across the surface, are open at both ends, and are preferably disposed so as to be about equal in width to the alternate surface parts $b$, and are of uniform depth.

The tire B is usually of steel, and is made to fit upon the grooved periphery of the wheel-center. At each side and near the inner edge the tire is formed with an annular groove, $c$, of suitable depth and in transverse sections, having one of its walls $d$ substantially parallel with the inner side of the tire. The other wall of the groove is preferably made curved, as shown, for a purpose to be presently stated.

I provide keys $e$, preferably of low-grade steel, to perfectly fit into all the grooves of the wheel-center, being bound thereto by the dovetail form of the grooves and the dovetail edges of the keys. These keys are as much greater in length than the width of the tire as will allow them to extend equally beyond the ends of the grooves a distance sufficient to permit them to be turned over the opposite sides of the tire into the grooves therein, as shown in Fig. 2, so that the keys, being locked to the wheel-center between their ends, as stated, will be also locked to the tire at their ends. To render this lock with the tire effective, its grooves should have one flat wall, which is preferably parallel with the inner side of the tire, over and upon the sides of which the projecting ends of the flat keys are driven into the grooves. To facilitate the entrance of the ends of the keys into these grooves, they are rounded at $f$, and the tire-grooves are also rounded at $g$, so as to make them flaring at one side. That part of the tire over which the ends of the flat keys are bent is preferably rounded to form a sort of bead projection, $h$, which may, in fact, project wholly from the sides of the tire, and thus dispense with the grooves, while giving the same hold for the keys and forming equivalents for the grooves.

The keys may be tapering lengthwise, as shown in Fig. 7, and in constructing the wheel they may be separately driven into the grooves of the wheel-center before the tire is applied; or, if desired, said keys may be placed in the mold for the center, and thus be securely united to the latter in the operation of casting. In such case the keys may be provided with holes $i$, into which the molten metal will run and form pins $n$, and thus pin the keys to the center, as seen in Fig. 6.

It will be understood that, the wheel-center having been completed as described, the steel tire is shrunk thereon and the keys bent and fastened thereto. The manner of securing the keys to the center of the wheel renders them practically a solid part the entire width thereof, as the tire is shrunk alike upon the keys and the center part, while the ends of the keys thus bound as a part of the center are bent into or over a part of the tire all round its sides, so as to render the ends of the keys practically integral with the tire.

The grooves or projecting tire parts can be made while the tire is being rolled or turned out, the center cast with its grooves, and the keys easily made, so that by my improvement the expense and labor of securing steel tires to cast-iron centers is comparatively little.

To remove the tire, the ends of the keys are straightened out and left in the center part for securing the new tire. The keys are about one and a half inch wide and three-eighths of an inch thick.

In Figs. 5 and 6 the keys are shown in dotted lines as they appear projecting equally at each end at each side from the wheel-center, so that after the tire is properly shrunk thereon the keys are bent at each end into a locked position with the tire, as shown in full lines; but the keys must first be locked with the wheel-center. The locking of the keys both to the wheel-center and to the tire prevents the latter from flying away or becoming separated from the tire even though the latter should break. It will also be seen that the pinning of the separate keys to the wheel-center prevents them from any possible sidewise slipping movement upon the wheel-center should the tire become loose.

The separate fastening-keys, while giving the advantage of convenient application and of being easily fastened, give also the important advantage of allowing the tire to be shrunk directly upon the wheel-center, and thereby be firmly fixed and have a firm seating. It is important, also, to notice that the locking of the keys with the tire is effected by bending the ends of the keys over in lapping or return positions, so as to give effective holds upon the tire.

In wheels of this class various means have been proposed for fastening the wheel-centers, and it has been proposed to make such fastening by means of an intermediate plate loosely placed upon the wheel-center and then shrinking the tire upon this loosely-placed plate and securing the latter by notching its edges, so as to form split clips, which are bent over into locking relation with the tire and with the wheel-center; but I find that the shrinking of the tire upon an interposed loosely-placed locking-plate is not only attended with much difficulty in the operation, but that such plate forms an uncertain seating for the tire by reason of inequalities in its surface and in its thickness. It is in these particulars that my improvement gives better results and produces a safer and more durable wheel.

In Fig. 1 I have shown two of the keys removed at m m to illustrate the relation of the dovetail grooves in the wheel-center to the annular grooves in the tire.

What I claim as new is—

1. In a car-wheel, the tire formed with an outside bead or projecting part around each of its inner edges, in combination with the center hub part having transverse dovetail grooves in its circumference and metal keys fastened within said grooves and having their ends bent up, over, and around said tire projecting parts, substantially as described.

2. The combination of a wheel-center formed with dovetail transverse grooves in its periphery, a tire formed with circular grooves in its sides, and keys adapted to be bound within said transverse grooves and have their ends bent and secured within the side grooves of said tire, substantially as described.

3. The tire of a car-wheel having an annular groove on each side, each formed with one of its walls flat, as described, in combination with a wheel-center having dovetail grooves around its periphery and flat keys adapted to be secured within said dovetail grooves and bent and secured within and upon the flat walls of said grooves, substantially as described.

4. The center part of a car-wheel having keys within and around its periphery and projecting from each side thereof, as described, in combination with a tire having an annular groove on each side, into which the ends of the keys are bent and secured, for the purpose stated.

5. The combination of a wheel-center formed with transverse, dovetailed, and tapering or wedge-shaped grooves in its periphery, a tire formed with circular grooves in its sides, and dovetailed and tapering or wedge-shaped keys which fit in said dovetailed grooves of the center and have their ends bent or hooked into said grooves of the tire, substantially as described.

6. The combination of a wheel-center, dovetailed and slightly tapering or wedge-shaped keys formed with holes secured in the periphery of said wheel-center, having the metal of said center entering said holes, and having their ends projecting beyond the sides of said center, and a tire formed with circular grooves in its sides and having the ends of said keys bent or hooked into said grooves, substantially as described.

7. As a new article of manufacture, a wheel having a tire and a wheel-center, the former being shrunk directly upon the latter, and a series of keys separately locked to the wheel-center, within dovetail grooves across its periphery, projecting at each end beyond said center, and locked to the tire, whereby each fastening-key is firmly embedded in the wheel flush with its periphery and locked at each end to the tire, substantially as described.

In testimony whereof I have hereunto set my hand in the presence of two subscribing witnesses.

NATHAN WRIGHT.

Witnesses:
ALEX. C. CASKEY,
N. S. CALHOUN.